Patented Jan. 11, 1927.

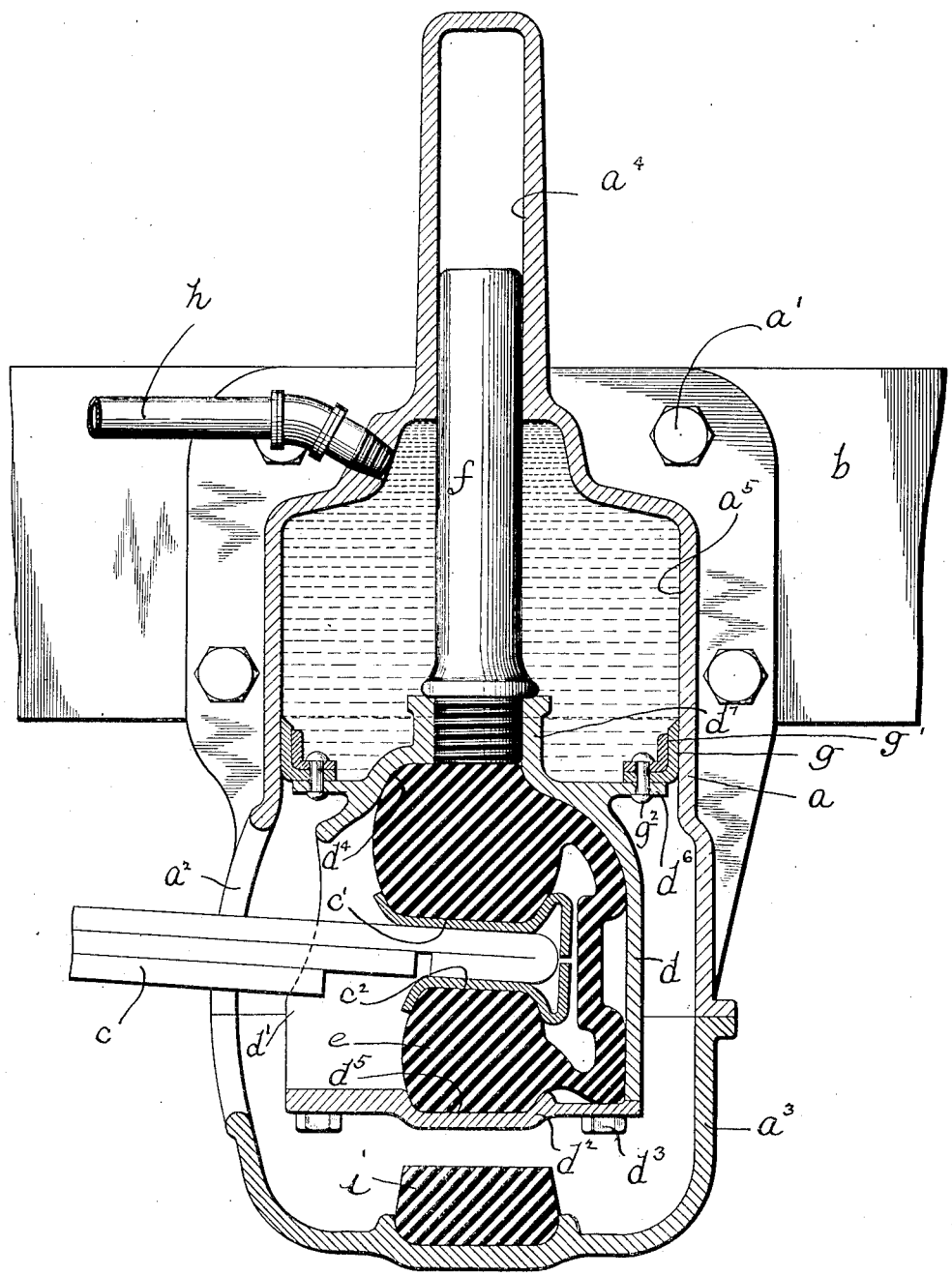

1,613,763

UNITED STATES PATENT OFFICE.

ALFRED FELLOWS MASURY, OF NEW YORK, N. Y., ASSIGNOR TO INTERNATIONAL MOTOR COMPANY, OF NEW YORK, N. Y., A CORPORATION OF DELAWARE.

CUSHION CONNECTION FOR VEHICLE CONSTRUCTION.

Application filed February 21, 1925. Serial No. 10,730.

This invention relates to vehicle springs and more particularly to a connection between the spring and the body or frame of the vehicle which is capable of adjustment to vary the relative position of the spring and the body or frame. Under conditions of heavy load causing the flexion of the vehicle spring the body of the vehicle is normally lowered to such an extent as to materially decrease the distance between the body and axle. It is an object of the present invention to provide an adjustment for the connection between the spring and the body whereby the length of the connection between the end of the spring and the body may be increased under conditions of heavy load whereby the relative positions of the axle and body or frame may be maintained relatively constant. Accordingly, the end of the spring is secured to the frame by means by which the position of the spring with respect to the frame may be controlled. Another object of the invention, stated broadly, is to provide fluid pressure means for effecting the adjustment. To this end, the end of the spring may be secured to a plunger or the like carried with the frame and movable with respect thereto, means being provided to vary the position of the plunger with respect to the frame to control the position of the spring with respect to the frame. More particularly the invention in the illustrated embodiment shows the end of the spring retained by a yielding non-metallic connection carried with what is in effect a piston operating within a cylinder carried upon the frame and the position of the piston in the cylinder is controlled by fluid pressure. In the interest of convenience the pressure of the fluid upon the piston is controlled from a remote point preferably proximate to the operator of the vehicle. The invention also resides in the particular combination of elements which have been adopted to meet practical requirements of manufacture and use. The invention will now be described more particularly with reference to the accompanying drawing illustrating, partly in vertical section and partly in elevation, a preferred embodiment wherein a housing is shown as carried with the vehicle frame and formed in its upper portion with a pressure cylinder within which operates a piston carrying an inner housing into which the end of the spring extends, yielding non-metallic material being disposed within the inner housing and engaging the end of the spring.

In the drawing a housing $a$ is shown as carried upon the longitudinal side member $b$ of the vehicle frame as by means of the bolts $a'$. The housing $a$ is formed in the lower portion of one side thereof with an opening $a^2$ into which the end of a vehicle spring extends. For convenience in assembly the lower portion of the housing may be formed by a closure or cap $a^3$ adapted to be removably secured in any convenient manner to the housing $a$ as clearly illustrated in the drawing. Within the housing $a$ there is disposed an inner housing $d$ having an open side $d'$ substantially in register with the opening $a^2$ and the end of the spring $c$ is adapted to extend within the inner housing $d$. For convenience in assembly the bottom wall of housing $d$ is removable as at $d^2$ and is adapted to be secured to the housing $d$ by the bolts $d^3$. Within housing $d$ is disposed yielding non-metallic material $e$ which is adapted to engage the end of the spring and form a yielding non-metallic connection and support between the housing and the spring. Preferably the yielding non-metallic material takes the form of blocks of rubber disposed above and below the spring end with capacity for distortion whereby a degree of relative movement between the spring and the housing is afforded. As the life, resiliency and strength of the yielding non-metallic material is increased by retaining it under compression the rubber $e$ is so maintained in the illustrated embodiment by means of the bottom wall $d^2$ and the bolts $d^3$. Seats $d^4$, $d^5$ may be formed in the housing $d$ and closure $d^2$, respectively and co-operating seats $c'$, $c^2$ may be formed on the end of the spring. These seats contribute in well known manner to the disposition of the yielding non-metallic material with respect to the frame and housing.

Exteriorly of the housing $d$ and in the upper portion thereof there is formed a flange $d^6$. This flange fits fairly closely the interior of the housing $a$ above the opening $a^2$ and is, in effect, a piston or plunger slidable within the upper portion of housing $a$. Centrally of the housing $d$ the top thereof is formed with an annular interiorly threaded portion $d^7$ into which is threaded a rod or guiding element $f$ slidable within a cylindrical recess $a^4$ formed in the upper part of the housing $a$. Rod $f$ serves not only as a centering and guiding means for the piston $d^6$ but also serves as a limit stop for the inward movement thereof. It is obvious that the upper portion of the housing $a$ within which the piston $d^6$ slides need not necessarily be cylindrical but the piston and cylinder may have various cross sectional configurations.

It is proposed to fill the upper interior portion of housing $a$ which for convenience in reference is given the reference character $a^5$ with a fluid which not only serves as a yielding cushion absorbing to a degree shocks otherwise transmitted from the spring to the housing $d$ but as means for regulating the position of the piston $d^6$ in cylinder $a^5$ to determine the relative positions of the vehicle spring and frame. To form a fluid type joint packing $g$ of any convenient kind may be secured to the circumferential edge of piston $d^6$. In the illustrated embodiment such packing is shown as secured to the top face of the piston and is turned upwardly to engage the inner walls of the chamber $a^5$. This packing may be secured to the piston as by means of an angle piece $g'$ secured as by the rivets $g^2$.

To control the relative positions of the vehicle spring and frame it is proposed to increase or decrease the fluid pressure within chamber $a^5$. To this end a conduit $h$ is shown as opening into the upper portion of the chamber $a^5$ and this conduit may lead to or from any convenient type of pressure regulating device disposed preferably in proximity to the operator of the vehicle. It will probably be found most practical to use a liquid such as oil or the like within the chamber $a^5$. A buffer or yielding limit stop $i$ may also be disposed in the cap $a^3$. This cushion is preferably formed of yielding non-metallic material and is so positioned as to yieldingly limit the outward movement of the piston on occasion of rebound.

With the adjusting device according to the present invention any desired distance between the axle and frame of the vehicle may be, within limits, obtained. Under conditions of no load or light load when the vehicle spring $c$ is not flexed to any appreciable degree some of the fluid may be withdrawn from the chamber $a^5$ to permit the piston $d^6$ to move inwardly and thus to lower housing $a$ and the frame to which it is attached with respect to the end of the spring. Under conditions of heavy load when the spring $c$ is flexed to the extent that its ends pass through the horizontal plane of its connection with the axle and it is in effect bowed downwardly the pressure of the fluid within chamber $a^5$ may be increased in suitable manner to force piston $d^6$ downwardly within the cylinder to increase the distance between the frame and axle and thus in effect raise the frame.

Various modifications may be made in the means adopted to vary the length of the spring connection and no limitation of the broad principle involved is intended by the foregoing description or illustration, reference being had to the appended claims for a delineation of the scope of the invention.

What I claim is:

1. In a vehicle, the combination with a vehicle spring and the frame, of a connection between an end of the spring and the frame including positive fluid pressure means to control the distance between the spring end and the frame.

2. In a vehicle, the combination with a vehicle spring and the frame, of a connection between an end of the spring and the frame, including a cylinder carried with the frame, a piston in the cylinder, means to yieldingly connect the end of the spring to the piston, and means to vary the position of the piston in the cylinder.

3. In a vehicle, the combination with a vehicle spring and the frame, of a connection between the end of the spring and frame including a cylinder carried with the frame, a piston in the cylinder, means to yieldingly connect an end of the spring to the piston with provision for relative movement therebetween, and fluid pressure means to vary the position of the piston in the cylinder.

4. In a vehicle, the combination with the vehicle spring and the frame, of a connection between an end of the spring and the frame including a housing carried with the frame and having an opening in one side thereof into which an end of the spring extends, a piston slidable in the housing above the opening, a housing carried below the piston and having an open side into which the end of the spring extends, yielding non-metallic material disposed within the last named housing and engaging the spring, and fluid in the housing above the piston.

5. In a vehicle, the combination with the vehicle spring and the frame, of a connection between an end of the spring and the frame including a housing carried with the frame and having an opening in one side thereof into which an end of the spring extends, a piston slidable in the housing above the opening, a housing carried below the piston and having an open side into which the end of the spring extends, yielding non-metallic material disposed within the last named housing and engaging the spring, fluid in the housing above the piston, and means to vary the pressure of the fluid.

6. In a vehicle, the combination with the vehicle spring and the frame, of a connection between an end of the spring and the frame including a housing carried with the frame and having an opening in one side thereof into which an end of the spring extends, a piston slidable in the housing above the opening, a housing carried below the piston and having an open side into which the end of the spring extends, yielding non-metallic material disposed within the last named housing and engaging the spring, fluid in the housing above the piston, and means to vary the pressure of the fluid from a remote point.

7. In a vehicle, the combination with the vehicle spring and the frame, of a connection between an end of the spring and the frame including a housing carried with the frame and having an opening in one side thereof into which an end of the spring extends, a piston slidable in the housing above the opening, a housing carried below the piston and having an open side into which the end of the spring extends, yielding non-metallic material disposed within the last named housing and engaging the spring, means to limit the extreme movements of the piston, fluid in the housing above the piston, and means to vary the pressure of the fluid from a remote point.

This specification signed this 19th day of February, A. D. 1925.

ALFRED FELLOWS MASURY.